US012640469B2

(12) United States Patent
Li et al.

(10) Patent No.: US 12,640,469 B2
(45) Date of Patent: May 26, 2026

(54) RADIO FREQUENCY CONNECTION STRUCTURE

(71) Applicant: HEWLETT PACKARD ENTERPRISE DEVELOPMENT LP, Spring, TX (US)

(72) Inventors: Kuanyue Li, Beijing (CN); Aijun Liu, Beijing (CN); Hailong Bai, Beijing (CN); Jiguang Zheng, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 62 days.

(21) Appl. No.: 18/497,113

(22) Filed: Oct. 30, 2023

(65) Prior Publication Data

US 2025/0141099 A1     May 1, 2025

(51) Int. Cl.
H01Q 1/50        (2006.01)
H04W 88/08        (2009.01)

(52) U.S. Cl.
CPC .............. H01Q 1/50 (2013.01); H04W 88/08 (2013.01)

(58) Field of Classification Search
CPC .......... H01Q 1/38; H01Q 1/50; H01Q 1/2266; H01Q 5/371; H01Q 17/11; H01Q 17/102; H01Q 17/104; H01Q 17/318; H01Q 17/0085
See application file for complete search history.

(56) References Cited

U.S. PATENT DOCUMENTS

| | | | |
|---|---|---|---|
| 5,955,888 A | 9/1999 | Fredrickson et al. | |
| 6,049,314 A * | 4/2000 | Munson ............... | H01Q 9/0471 |
| | | | 343/846 |
| 6,295,031 B1 * | 9/2001 | Wallace ............... | H05K 1/0218 |
| | | | 343/702 |
| 7,079,081 B2 * | 7/2006 | Parsche .................. | H01Q 13/12 |
| | | | 343/702 |
| 7,586,449 B1 * | 9/2009 | Chen ..................... | H01Q 1/2266 |
| | | | 343/702 |
| 8,610,439 B2 | 12/2013 | Nickel et al. | |
| 9,742,208 B2 | 8/2017 | Stratton et al. | |
| 9,844,144 B1 | 12/2017 | Al-Momani et al. | |
| 9,941,627 B2 | 4/2018 | Esmaeili et al. | |
| 10,727,621 B1 | 7/2020 | Senofsky et al. | |

(Continued)

FOREIGN PATENT DOCUMENTS

| | | |
|---|---|---|
| WO | 2010/048971 A1 | 5/2010 |
| WO | 2020/021157 A1 | 1/2020 |

*Primary Examiner* — Tung X Le
(74) *Attorney, Agent, or Firm* — Hewlett Packard Enterprise Patent Department

(57)        ABSTRACT

Implementations of the present disclosure relate to radio frequency (RF) connection. In the implementations, an access point (AP) comprises an antenna module, a separation plate, a main board, and a connector. The antenna module is fixed on the first surface of the separation plate. The connector comprises an inner conductor and an outer conductor passing through a hole in the separation plate and connects the trace of the antenna module with the electronic components in the main board. The inner conductor and the outer conductor are retractable along a direction perpendicular to the main board. In this way, by directly connecting the antenna with the main board by a retractable connector, additional cables can be spared without sacrificing the mechanical performance of the connection structure.

20 Claims, 12 Drawing Sheets

(56) References Cited

U.S. PATENT DOCUMENTS

| | | | |
|---|---|---|---|
| 10,805,707 B2 | 10/2020 | Grebe et al. | |
| 2013/0169489 A1* | 7/2013 | Tamura | H01Q 1/3275 |
| | | | 343/702 |
| 2016/0356842 A1 | 12/2016 | Lee | |
| 2017/0012396 A1 | 1/2017 | Kwon et al. | |
| 2019/0131695 A1* | 5/2019 | Thiruvarankan | H01Q 1/38 |
| 2020/0221210 A1 | 7/2020 | Grebe et al. | |
| 2020/0259248 A1* | 8/2020 | Lv | H01Q 21/28 |

* cited by examiner

RADIO FREQUENCY CONNECTION STRUCTURE

BACKGROUND

In the access point (AP) structural design, the radio frequency (RF) chains are extended more and more on Wireless Fidelity (Wi-Fi) transmission devices, Bluetooth Low Energy (BLE) transmission devices, and Global Position System (GPS) transmission devices. In some cases, the number of antennas embedded on such devices will be going up to 10 or more.

In order to properly install the antennas, the cables for the antennas and associated RF connectors are used to connect the antenna with a printed circuit board (PCB). In this case, the routing of the cables and placement of the connectors are specifically designed such that the interferences between electronic components in the devices will be minimized, and the usage of space inside the devices will be maximized.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1A:
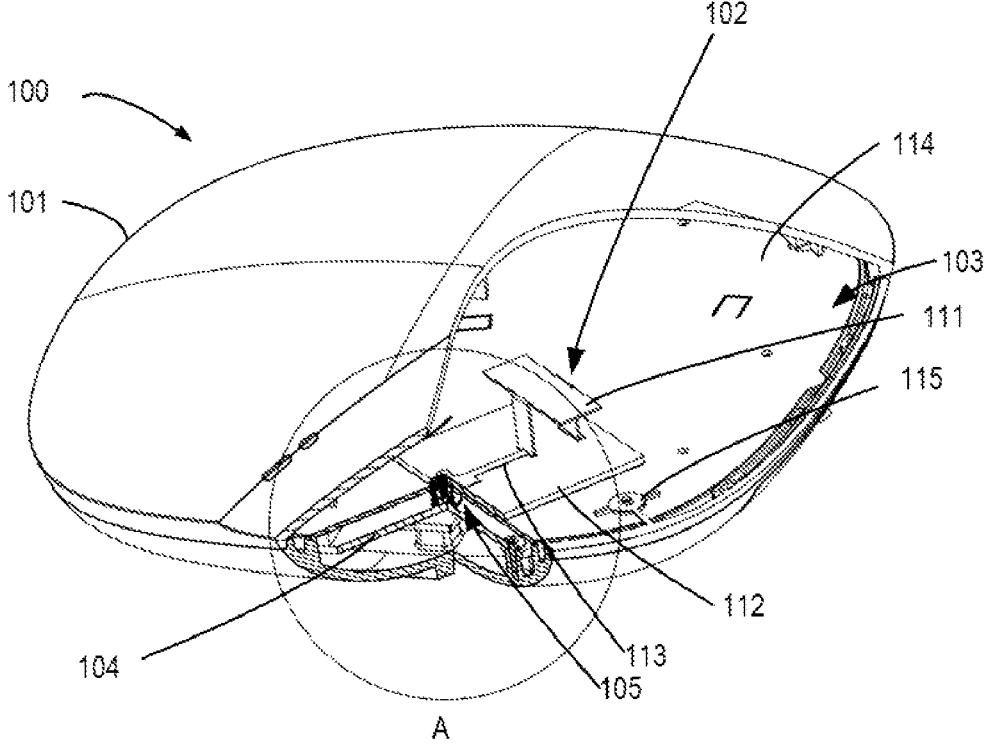
FIG. 1A illustrates a schematic view of an example RF transmission device in accordance with some example implementations of the present disclosure.

Conventionally, in order to shield the inferences generated by the antenna from the electronic components in the printed circuit board (PCB), which may be influenced by the RF signals, a metal plate will be provided between the antenna and the PCB board in order to separate the antenna from the PCB board. In this case, the RF cables and connectors used to connect the antennas and the corresponding traces on the PCB board are guided from the antenna through the metal plate to reach the PCB board. For example, the antenna may be fixed on the metal plate. One end of the RF cable may be connected to the antenna and guided on the surface of the metal plate for a specific distance before the RF cable reaches the through hole in the metal plate. Then, the RF cable is further guided to pass through the through hole. At the other end of the RF cable, an RF plug may be provided and inserted in a corresponding RF jack. In this way, the RF signals received by the antenna can be transmitted to the electronic components on the PCB board.

However, although interface shielding requirements may be satisfied by means of the above connection structure, the guidance of the cable increases the complexity of the installation of the AP, and the gaps between the cable and the metal plate in the through hole increase the noise and spur leakage possibility.

Various example implementations of the present disclosure propose an RF connection structure without cables. In this RF connection structure, a connector is provided between the antenna and the main board through the separation plate. A base board for supporting the antenna is arranged on the metal plate for separating the antenna and the PCB board. A connector is provided through a hole in the metal plate to connect a trace on the base board with a contact on the PCB board so as to allow the signals received from the antenna to transmit to the corresponding electronic components on the PCB board.

With these implementations, there is no cable used, Thus, no additional through holes are provided in the separation plate. In this way, the holes preserved for cables in the conventional APs can be spared thereby minimizing the noise or spur leakage possibility through the metal plate.

In another aspect, a variety of conventional RF connectors that may be used in the RF transmission devices generally include a rigid male module and a rigid female module. If the conventional RF connectors were directly used between the antenna module and the main board, there would be high stresses between the antenna module and the conventional RF connectors as well as between the main board and the conventional RF connectors when the length does not match the distance between the antenna module and the main board due to some manufacture tolerance. By contrast, the connector, in accordance with the present disclosure, includes an inner conductor and an outer conductor, both retractable along the assembly direction. In this way, the retractable conductors of the connector can minimize the stress between the connector and the main board or the antenna module.

FIG. 1A illustrates a schematic view of an example RF transmission device in accordance with some example implementations of the present disclosure. As illustrated in FIG. 1A, the RF transmission device may be an AP 100 for connecting other Wi-Fi devices to a wired network. During the service, the AP 100 may be installed on an installation surface. The AP 100 may extend along a first direction parallel to the installation surface.

In order to provide networking services, the AP 100 comprises an antenna module 102 for the transmission of RF signals. In the illustrated implementations, the AP 100 further comprises a housing 101, and the antenna module 102 is accommodated in the housing 101. The antenna module 102 comprises an inner antenna 111 for RF signal transmission. For example, the AP 110 may receive wireless signals from other APs or client devices and transmit the wireless signals to other APs or client devices via the antenna 111. The antenna module 102 further comprises a base board 112. The base board 112 supports the antenna 111. In some example implementations, the base board 112 may comprise isolated materials. In order to deliver wireless signals received from the antenna 111 to the signal processing components of the AP 100, a trace 113 is provided on the base board 112 and is connected to the antenna 111.

As discussed above, the antenna 111 may have to be separated from the electronic components. In this regard, the AP 100 further comprises a separation plate 103. The separation plate 103 may be a metal plate for shielding interference. The separation plate 103 includes a first surface 114. In this case, the first surface 114 extends along the first direction parallel to the installation surface and the antenna module 102 is fixed on the first surface 114 of the separation plate 103. The separation plate 103 is fixed in the housing 101 via a fixing member 115. For example, the fixing member 115 may be a threaded connection with a threaded bolt connecting a lug extending from an inner wall of the housing 101 with the separation plate 103.

The AP 100 further comprises a main board 104 on which most of the electronic components of the AP 100 are arranged. The main board 104 is arranged on another side of the separation plate 103, different from the antenna module 102 such that the separation plate 103 is able to separate the electronic components on the main board 104 from the antenna 111. Further, the AP 100 comprises a connector 105 to connect the antenna 111 with the electronic components on the main board 104. The main board 104 and the connector 105 will be described in detail with reference to FIG. 1B.

Figure 1B:
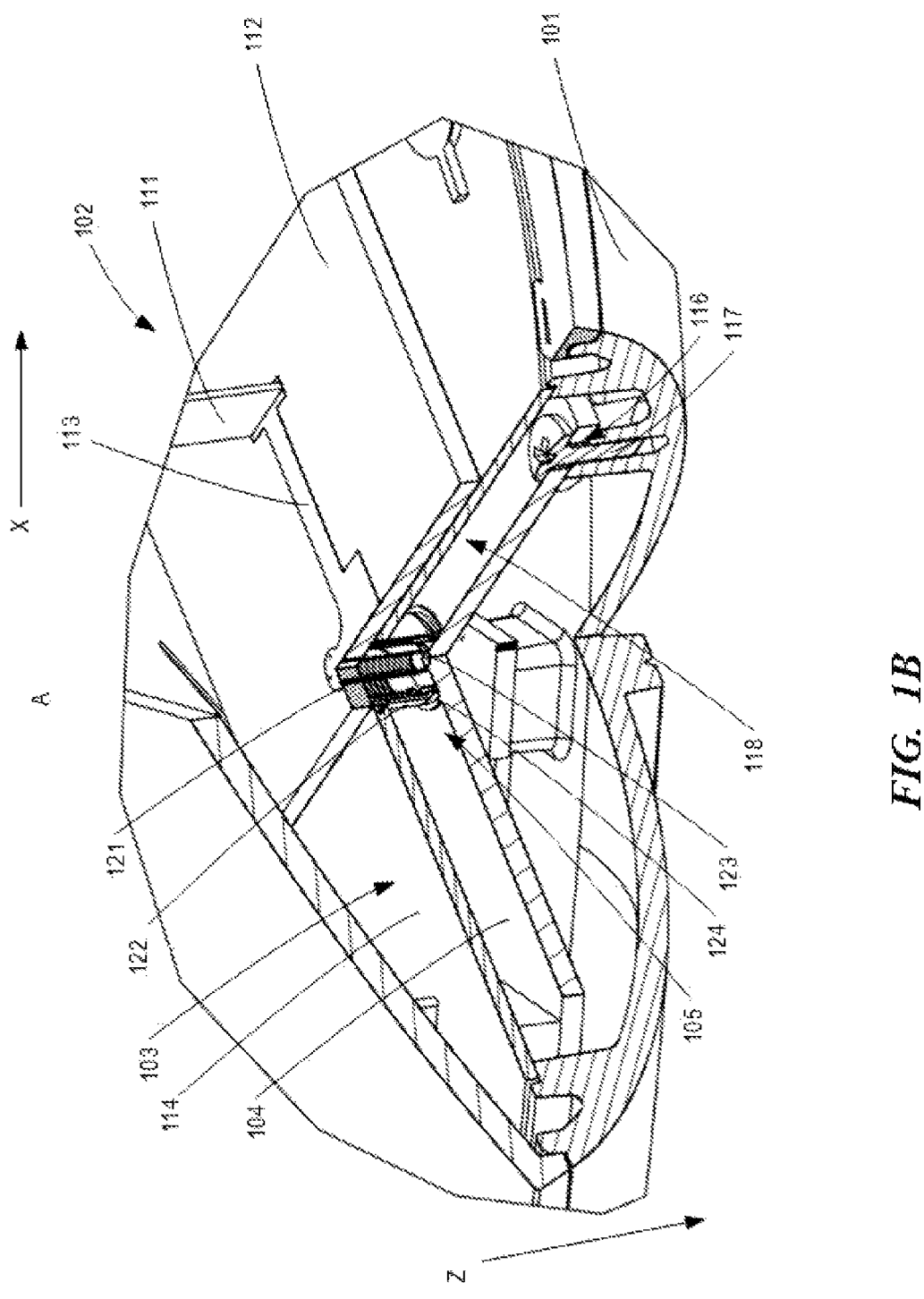
FIG. 1B illustrates a schematic view of an example RF transmission device illustrated in FIG. 1A with a partially-enlarged section view in accordance with some example implementations of the present disclosure.

FIG. 1B illustrates a schematic view of an enlarged portion A of the example RF transmission device illustrated in FIG. 1A in accordance with some example implementations of the present disclosure. As illustrated is FIG. 1B, the RF transmission structure includes respective parts of the antenna module 102, the separation plate 103, the main board 104, and the connector 105. The main board 104 is fixed in the housing 101 via a fixture in the form of a screw connection. The main board 104 includes a threaded hole 116. The threaded hole 116 is aligned with a threaded hole on the housing 101. A screw bolt 117 is screwed into both the threaded hole 116 and the threaded hole on the housing 101 to fix the main board 104 onto the housing 101.

The main board 104 is connected to the separation plate 103 via the connector 105. The connector 105 comprises an inner conductor 121 and an outer conductor 122. Both the inner conductor 121 and the outer conductor 122 extend along a second direction Z, perpendicular to the first direction X, and pass through a hole in the separation plate 103.

The connector 105 further comprises an inner pad 123 and an outer pad 124. The inner pad 123 and an outer pad 124 are arranged on a surface of the main board 104 facing towards the second surface 118 of the separation plate 103. The inner pad 123 and an outer pad 124 may be further connected to the electronic components on the main board 104. The inner pad 123 contacts the inner conductor 121, and the outer pad 124 contacts the outer conductor 122.

Further, on the first surface 114 of the separation plate 103, the antenna module 102 as described with reference to FIG. 1A is provided. The antenna module 102 includes a base board 112. The base board 112 is arranged on the first surface 114 of the separation plate 103. The antenna 111 is provided on the base board 112. The antenna 111 includes a stand. The stand is fixed on the base board 112 and extends in the second direction Z from the base board 112. At the position where the stand is fixed, a first end of the trace 113 is provided. The trace 113 extends on the surface of the base board 112 towards an edge of the base board 112 and terminates before reaches the edge. The trace 113 bends and extends along the second direction towards the separation plate 112.

The trace 113 terminates at a second surface of the base board 112 and is connected to the inner conductor 121. The second surface of the base board 112 is connected to the first surface 114 of the separation plate 103. The outer conductor 122 is fixed on the second surface of the base board 112.

In the assembling stage, the antenna module 102 may be fixed on the separation plate 103 in the first place. Then, the inner conductor 121 may be fixed to the base board 112, for example, by welding, such that the inner conductor 121 is electrically coupled to the trace 113. The outer conductor 122 may also be fixed to the base board 112 without connecting to other conducting members to provide grounding. Later, the main board 104 may be mounted in the housing 101. When the main board 104 is properly mounted, the separation plate 103 with the antenna module 102 fixed thereon may be placed onto the main board 104 such that the corresponding fixing members on the main board 104 and fixing members on the separation plate 103 are correctly aligned with each other. In the meantime, the inner conductor 121 is aligned with the inner pad 123, and the outer conductor 122 is aligned with the outer pad 124.

In some example implementations, the inner conductor 121 and the outer conductor 122 may be longer than the nominal distance between the main board 104 and the separation plate 103 due to a manufacture tolerance. In this case, when the inner conductor 121 and the outer conductor 122 become in contact with the inner pad 141 and the outer pad 124 respectively, the inner conductor 121 and the outer conductor 122 may retract towards the base board 112 so that the length of the inner conductor 121 and the outer conductor 122 match the distance between the main board 104 and the separation plate 103. In this way, by means of the retractions of both the inner conductor 121 and the outer conductor 122, the compressive stress between the connector 105 and the main board 104 can be minimized. Therefore, the separation plate 103 can be properly and easily mounted on the main board 104.

In some example implementations, the retractable conductors may comprise elastic materials. For example, an end surface of the conductor may comprise a thin copper sheet that can bent over upon receiving external pressure. In some example implementations, the retractable conductors may comprise retractable mechanisms involving elastic members like springs. It should be appreciated that the retractable function can be implemented by a variety of corresponding mechanisms. The present disclosure does not indicate any limitations thereto.

Figure 2:
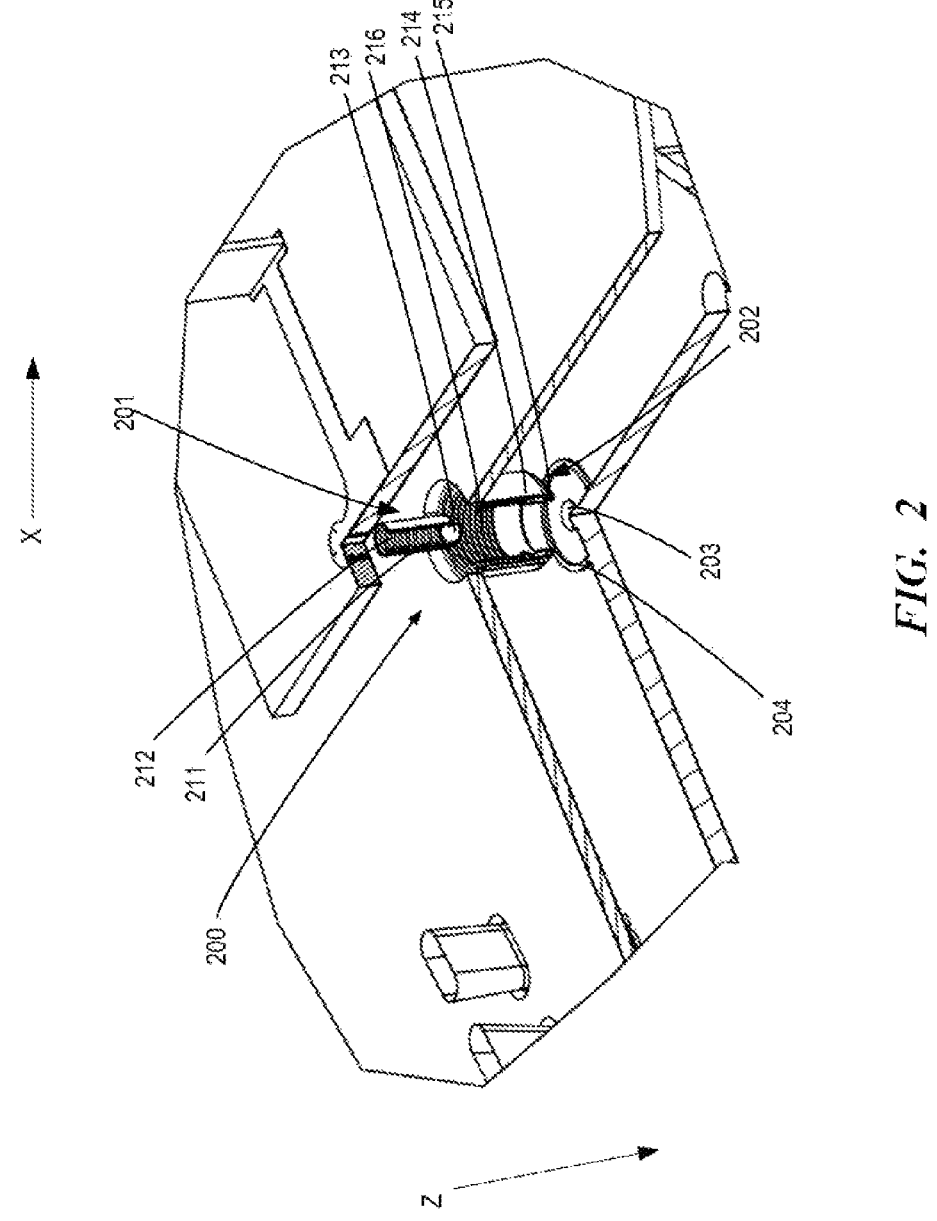
FIG. 2 illustrates a schematic explosive view of an example RF transmission device with a partially-enlarged section view in accordance with some example implementations of the present disclosure.

FIG. 2 illustrates a schematic explosive section view of a portion of an example RF transmission device in accordance with some example implementations of the present disclosure. As illustrated in FIG. 2, the RF transmission device is also an AP. The AP is partially sectioned. As illustrated, the RF transmission structure includes the antenna module, the separation plate, the main board and the connector 200. The antenna module, the separation plate and the main board may be corresponding to the same elements in FIG. 1B and detailed descriptions of these elements are omitted here.

As illustrated in FIG. 2, the antenna module is configured to be provided on the first surface of the separation plate extending along a first direction X. A trace extending on the base board of antenna module is configured to be connected to the connector 200.

The connector 200 comprises two modules, including a male module and a female module. The male module includes an inner conductor 201 and an outer conductor 202. Both the inner conductor 201 and the outer conductor 202 extend along a second direction Z perpendicular to the first direction X and pass through a through hole in the separation plate. The female module of the connector 200 comprises an inner pad 203 and an outer pad 204. As illustrated, the inner pad 203 is a circle conductor, and the outer pad 204 is a ring conductor coaxial with inner pad 203. The inner pad 203 and the outer pad 204 are arranged on a surface of the main board facing towards the separation plate. The inner pad 203 and the outer pad 204 may be further connected to the electronic components on the main board such that the RF signals can be delivered via the connector 200. The inner pad 203 is configured to contact the inner conductor 201, and the outer pad 204 is configured to contact the outer conductor 202.

In the illustrated implementation, the inner conductor 201 comprises a first cylinder body 211 which is configured to be connected to the trace. The first cylinder body 211 extends along the second direction Z. A first end of the first cylinder body 211 adjacent to the antenna module is configured to be fixed on antenna module and electrically coupled to the trace.

The inner conductor 201 further comprises a first contact member 213. The first contact member 213 is arranged at a second end of the first cylinder body 211 away from the antenna module. The first contact member 213 is configured to move along the second direction Z towards the antenna module upon contacting the inner pad 203 on the main board. The inner conductor 201 further comprises a first elastic member 212. A first end of the first elastic member 212 is configured to abut against a first stopper, which is configured to prevent the first end of the first elastic member 212 from moving along the second direction Z towards the antenna module. In the illustrated implementation, the first stopper is the antenna module. The first end of the first elastic member 212 is configured to abut against the second surface of the antenna module. A second end of the first elastic member 212 away from the first end is configured to be pressed against the first contact member 213.

The first cylinder body 211 includes a first hollow cylinder (may also be referred to as a first tube). The first hollow cylinder includes a first opening. The first opening is provided at a first end of the first hollow cylinder away from the antenna module. The first contact member 213 and the first elastic member 212 are arranged inside the first hollow cylinder. The first contact member 213 is configured to be pressed by the second end of the first elastic member such that at least part of the first contact member 213 protrudes out of the first opening.

The first contact member 213 comprises a first spherical member. Specifically, the first contact member 213 is in the form of a half ball. An edge of the first spherical member, which is a circle with a same radius as the half ball, contacts an inner sidewall of the first hollow cylinder. At least a part of the first spherical member protrudes out of the first opening such that the outer surface of the first spherical member contacts the inner pad 203 during device assembly.

In some example implementation, a first collar may be provided at the first opening. The first collar extends inwards from the first opening to form a ring around the first opening. The first collar is configured to be abutted against by the first spherical member when the first spherical member is pressed by the first elastic member to move along towards main board. In this way, the first collar can prevent the first spherical member from completely moving out of the hollow cylinder.

The outer conductor 202 comprises a second cylinder body 214. The second cylinder body 214 extends along the second direction from the antenna module. The second cylinder body 214 may be coaxial with the first cylinder body 211. The outer conductor 202 further comprises a second contact member 215. The second contact member 215 is arranged at a second end of the second cylinder body 214 away from the antenna module and configured to move along the second direction towards the antenna module upon contacting the main board, in particular upon contacting the outer pad 204 on the main board. The outer conductor 202 comprises a second elastic member 216. A first end of the second elastic member 216 is configured to abut against a second stopper which is configured to prevent the first end of the second elastic member 216 moving along the second direction towards the antenna module. In the illustrated implementation, the second stopper is also the antenna module. A second end of the second elastic member 216 away from the antenna module is pressed against the second contact member 215.

In the illustrated implementation, the second cylinder body 214 includes a second hollow cylinder (which may also be referred to as a second tube). A second opening is provided at a first end of the second hollow cylinder away from the separation plate 202. The second contact member 215, the second elastic member 216 are arranged inside the second hollow cylinder. The second contact member 215 is configured to be pressed by the second end of the second elastic member 216 such that at least part of the second contact member 215 protrudes out of the second opening.

The second contact member 215 comprises a third hollow cylinder. A first end of the third hollow cylinder adjacent to the antenna module is pressed by the second end of the second elastic member 216, and a second end of the third hollow cylinder away from the antenna module protrudes out of the second opening such that the second end of the third hollow cylinder may contact the outer pad 204 in the first place during device assemble stage.

In some example implementations, a second collar is provided at the second end of the third hollow cylinder. The second collar extends from the second end of the third hollow cylinder outwards and is configured to prevent the second end of the third hollow cylinder from moving into the third hollow cylinder. The second collar may arch along the second direction away from the antenna module to form a rounded edge.

In the assembling stage, when the main board is properly mounted, the separation plate with the antenna module fixed thereon may be placed onto the main board such that the inner conductor 201 is aligned with the inner pad 203 and the outer conductor 202 is aligned with the outer pad 204 for example in the same orientation as illustrated in FIG. 2. The inner conductor 201 and the outer conductor 202 are a little longer than the nominal distance between the main board and the separation plate 202. In this case, when the inner conductor 201 becomes in contact with the inner pad 203, the outer surface of the spherical member of the first contact member 213 contacts the top surface of the inner pad 203. As a consequence, the first contact member 213 resides on the inner pad 203, and the first elastic member 212 is compressed under continuous pressure from the antenna module such that the first cylinder body 211 and the first contact member 213 move towards each other. With reference to the first cylinder body 211, the first contact member 213 retracts deeper into the first cylinder body 211 along the second direction.

In the meantime, when the outer conductor 202 comes in contact with the outer pad 204, an edge of the second end of the second contact member 215 contacts the top surface of the outer pad 204. As a consequence, the second contact member 215 resides on the outer pad 204, and the second elastic member 216 is compressed under continuous pressure from the antenna module such that the second cylinder body 214 and the second contact member 215 move towards each other. With reference to the second cylinder body 214, the second contact member 215 retracts deeper into the second cylinder body 214 along the second direction.

In this way, the inner conductor 201 and the outer conductor 202 retract by means of the elastic members in the form of a spring so that the length of the inner conductor 201 and the outer conductor 202 match the distance between the main board and the separation plate. The compressive stress between the connector 200 and the main board can be minimized, thereby easing the complexity of assembly of the separation plate and the main board.

Figure 3A:
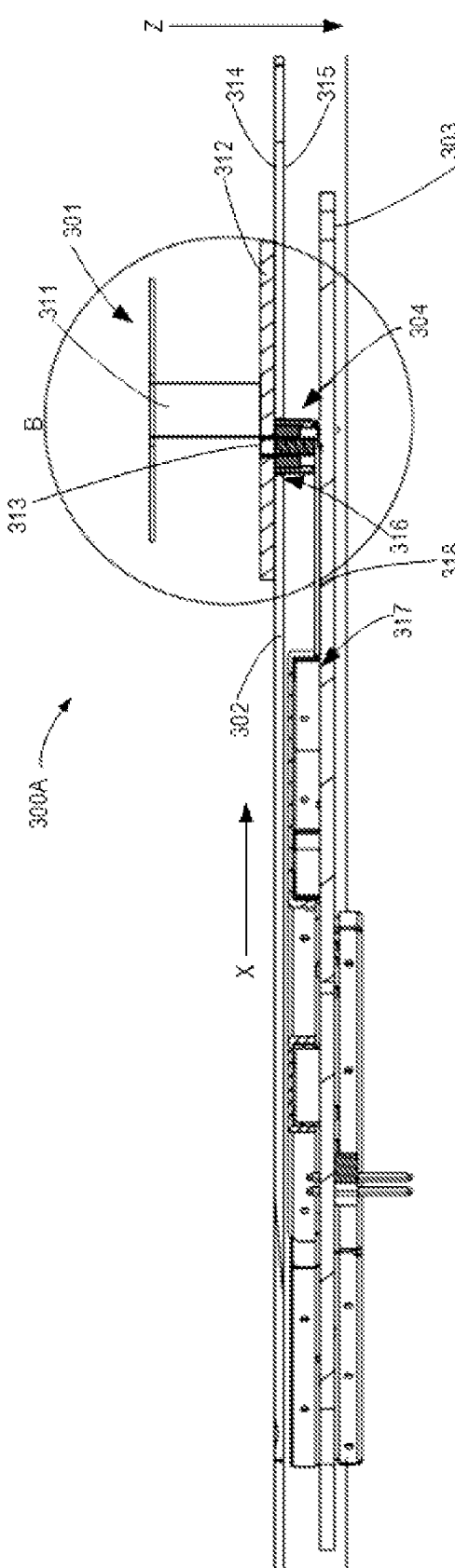
FIG. 3A illustrates a schematic section view of an example RF transmission structure of an RF transmission device in accordance with some example implementations of the present disclosure.

FIG. 3A illustrates a schematic section view of an example RF transmission structure 300A of an RF transmission device in accordance with some example implementations of the present disclosure. As illustrated in FIG. 3A, the RF transmission structure 300A comprises an antenna module 301, a separation plate 302, a main board 303, and a connector.

The antenna module 301 comprises an inner antenna 311 for RF signal transmission. The antenna module 301 further comprises a base board 312. The base board 312 supports the antenna 311. A trace 313 is provided on the base board 312 and is connected to the antenna 311.

The separation plate 302 may be a metal plate for shielding interference. The separation plate 302 includes a first surface 314 and a second surface 315 opposite to the first surface 314. The first surface 314 and the second surface 315 extend along a first direction X. The antenna module 301 is fixed on the first surface 314, and the second surface 315 faces towards the main board 303. The separation plate 302 further comprises a through hole 316 to allow the connector 304 extends from the base board 312 to the main board 303.

The main board 303 extends along the first direction X, and on the main board 303, electronic components 317 of the RF transmission device are arranged. The main board 303 is arranged on another side of the separation plate 302, different from the antenna module 301 such that the separation plate 302 may be able to separate the electronic components 317 on the main board 303 from the antenna 311. The main board 303 is connected to the antenna module 301 via the connector 304. The main board 303 further comprises a trace 318 or conductor connecting the connector 304 with the electronic components 317.

The connector 304 extends along a second direction Z perpendicular to the first direction X. A first end of the connector 304 is fixed to the base board 312 and electrically coupled to the trace 313. With the connection scheme in the illustrated implementation, when the antenna 311 receives RF signals, the RF signals may be transmitted from the antenna 311 via the trace 313, the connector 304 and the trace 318 to the electronic components 317. A part B of the RF transmission structure will be described in details with regard to FIG. 3B.

Figure 3B:
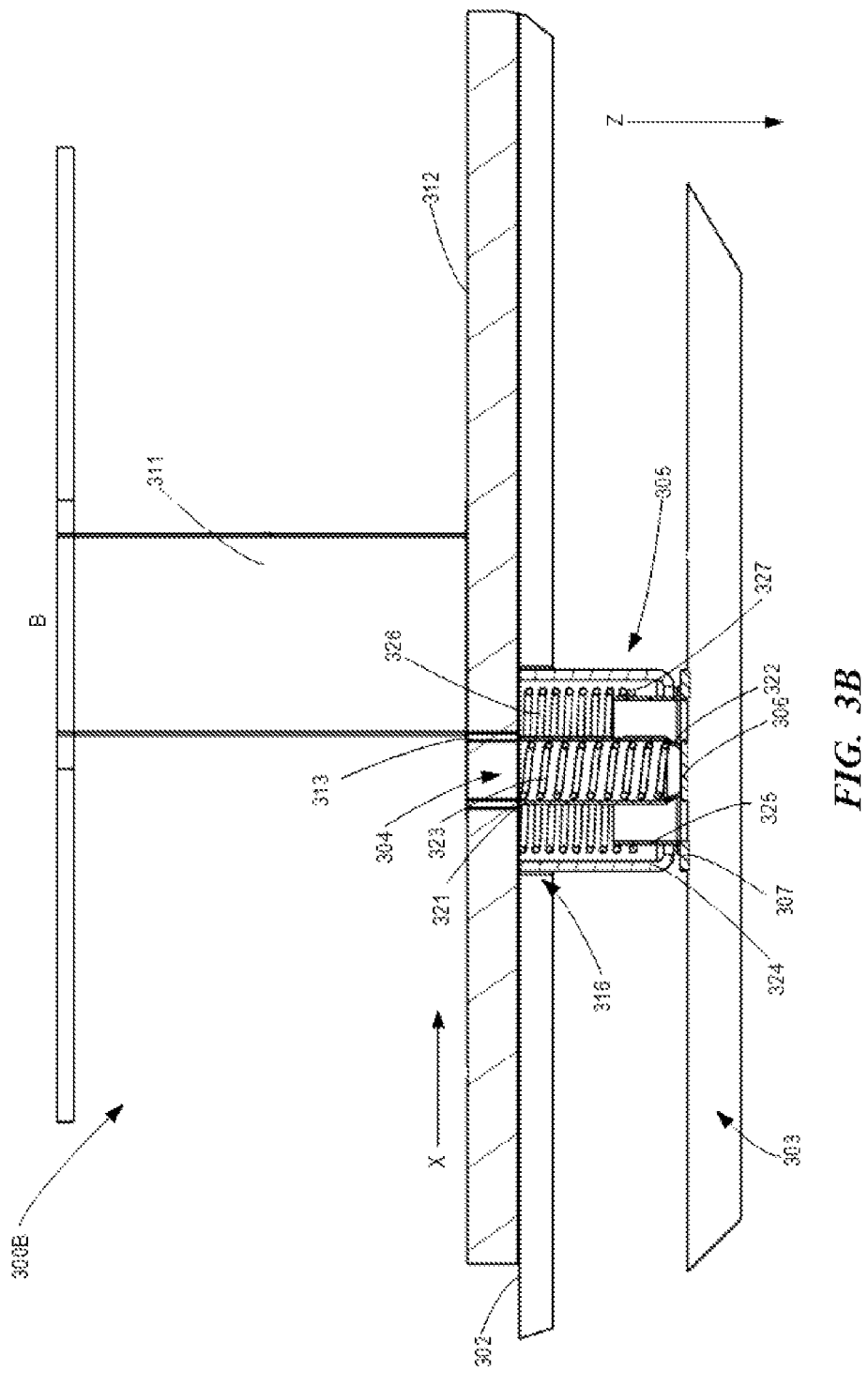
FIG. 3B illustrates a partial section view of a part of the example RF transmission structure in FIG. 3A in accordance with some example implementations of the present disclosure.

FIG. 3B illustrates a partial section view of a part B 300B of the example RF transmission structure 300A in FIG. 3A in accordance with some example implementations of the present disclosure. As illustrated in FIG. 3B, the part B 300B comprises the antenna module 301 and the connector 304 as well as a part of the separation plate 302 and a part of the main board 303. The descriptions about the elements and their connections which have already been described with reference to FIG. 3A will be omitted here.

The connector 304 comprises a male module and a female module. The male module includes an inner conductor 304 and an outer conductor 305. Both the inner conductor 304 and the outer conductor 305 extend along the second direction Z and pass through the through hole 316 in the separation plate 302. The female module of the connector 304 comprises an inner pad 306 and an outer pad 307. The inner pad 306 is a circle conductor, and the outer pad 307 is a ring conductor coaxial with inner pad 306. The inner pad 306 and the outer pad 307 are arranged on the surface of the main board 303, facing towards the second surface 315 of the separation plate 302. The inner pad 306 and the outer pad 307 may be connected to the electronic components 317 via the trace 318. The inner pad 306 contacts the inner conductor 304, and the outer pad 307 contacts the outer conductor 305.

The inner conductor 304 comprises a first cylinder body 321. The first cylinder body 321 extends along the second direction Z. A first end of the first cylinder body 321 adjacent to the base board 312 is fixed on the base board 312 and electrically coupled to the trace 313. The first cylinder body 321 includes a first hollow cylinder. The first hollow cylinder includes a first opening. The first opening is provided at a first end of the first hollow cylinder away from the base board 312. The inner conductor 304 further comprises a first contact member 322 and a first elastic member 323. The first contact member 322 and the first elastic member 323 are arranged inside the first hollow cylinder.

A first end of the first elastic member 323 abuts against the base board 312 such that the first end of the first elastic member 323 is prevented from moving along the second direction Z towards the base board 312. In the illustrated implementation, the first elastic member 323 is a spring. A second end of the first elastic member 323 away from the base board 312 is pressed against the first contact member 322.

The first contact member 322 is arranged at a second end of the first cylinder body 321, away from the base board 312. The first contact member 322 comprises a first spherical member. Specifically, the first contact member 322 is in the form of a hollow half ball. An edge of the first spherical member, which is a circle with a same radius as the half ball, contacts an inner sidewall of the first hollow cylinder such that the first contact member 322 maintains in electrical contact with the first cylinder body. A part of the first spherical member is pressed by the first elastic member 323 to protrude out of the first opening such that the outer surface of the first spherical member contacts the inner pad 306.

In the illustrated implementation, a first collar is provided at the first opening. The first collar extends inwards from the first opening to form a ring around the first opening. The first collar abuts against the first spherical member to prevent the first contact member from moving along towards the main board 303.

The outer conductor 305 comprises a second cylinder body 324. The second cylinder body 324 extends along the second direction from the base board 312. The second cylinder body 324 may be coaxial with the first cylinder body 321. The second cylinder body 324 includes a second hollow cylinder. A second opening is provided at a first end of the second hollow cylinder away from the base board 312. The outer conductor 305 further comprises a second contact member 325 and a second elastic member 326. The second contact member 325, the second elastic member 326 are arranged inside the second hollow cylinder.

The second elastic member 326 is a spring. A first end of the second elastic member 326, adjacent to the base board 312, abuts against the base board 312. A second end of the second elastic member 326 is pressed against the second contact member 325 such that at least part of the second contact member 325 protrudes out of the second opening.

The second contact member 325 comprises a third hollow cylinder. A third collar 327 is provided around the outer sidewall of the third hollow cylinder. The third collar 327 is pressed by the second end of the second elastic member 326, and a second end of the third hollow cylinder away from the base board 312 protrudes out of the second opening such that the second end of the third hollow cylinder may contact the outer pad 307 in the first place during device assemble.

In this implementation, a second collar is provided at the second end of the third hollow cylinder. The second collar extends from the second end of the third hollow cylinder outwards and configured to prevent the second end of the third hollow cylinder from moving into of the third hollow cylinder. The second collar arches along the second direction Z away from the base board 312, to form a rounded edge. In this way, the rounded edge may provide guidance during the assemble process and ease the retraction movement of the second contact member.

Figure 4:
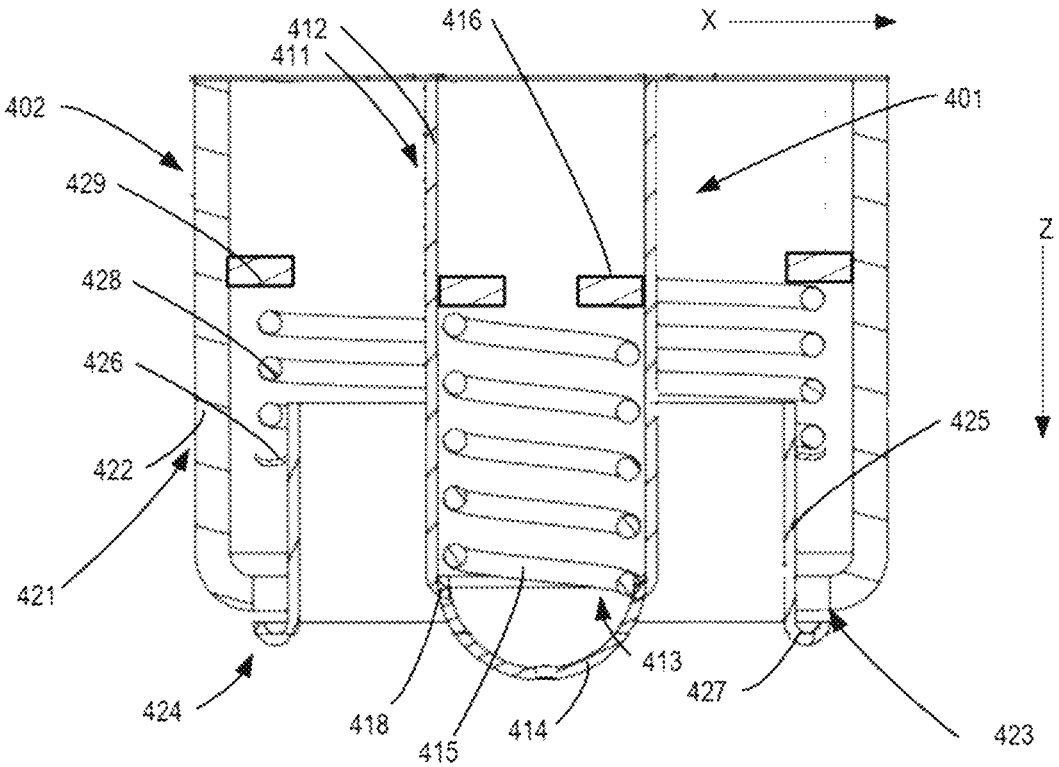
FIG. 4 illustrates a schematic view of a male module of an example RF connector in accordance with some example implementations of the present disclosure.

FIG. 4 illustrates a schematic view of a male module of an example RF connector in accordance with some example implementations of the present disclosure. As illustrated in FIG. 4, the male module comprises an inner conductor 401 and an outer conductor 402. Both the inner conductor 401 and the outer conductor 402 are configured to be fixed to a base board extending along a first direction X. The inner conductor 401 and the outer conductor 402 extend along the second direction Z perpendicular to the first direction X.

The inner conductor 401 comprises a first cylinder body 411. The first cylinder body 411 comprises a first hollow cylinder 412. The first hollow cylinder 412 extends along the second direction Z. A first end of the first hollow cylinder 412 adjacent to the base board is configured to be fixed on the base board. The first cylinder body 411 includes a first opening 413. The first opening 413 is provided at a second end of the first hollow cylinder 412, away from the base board. The inner conductor 401 further comprises a first contact member 414, and a first elastic member 415. The first contact member 414 and the first elastic member 415 are arranged inside the first hollow cylinder 412.

A first end of the first elastic member 415 abuts against a first stopper 416 such that the first end of the first elastic member 415 is prevented from moving along the second direction Z towards the base board. In the illustrated implementation, the first elastic member 415 is a spring. A second end of the first elastic member 415 away from the base board is pressed against the first contact member 414.

The first contact member 414 is arranged at a second end of the first hollow cylinder 412 away from the base board. The first contact member 414 comprises a first spherical member. Specifically, the first contact member 414 is in the form of a hollow half ball. An edge of the first spherical member, which is a circle with a same radius as the half ball, contacts an inner sidewall of the first hollow cylinder 412 such that the first contact member 414 maintains in electrical contact with the first cylinder body 411. The first spherical member is pressed by the first elastic member 415 such that a part of the first spherical member protrudes out of the first opening 413.

In the illustrated implementation, a first collar 418 is provided at the first opening 413. The first collar 418 extends inwards from the first opening 413 to form a ring around the first opening 413. The first collar 418 abuts against the first spherical member to prevent the first contact member 414 from moving completely out of the first hollow cylinder 412.

The outer conductor 402 comprises a second cylinder body 421. The second cylinder body 421 includes a second hollow cylinder 422. The second hollow cylinder 422 extends along the second direction Z from the base board. The second hollow cylinder 422 may be coaxial with the first hollow cylinder 412. A second opening 423 is provided at a first end of the second hollow cylinder 422 away from the base board. The outer conductor 402 further comprises a second contact member 424 and a second elastic member 428. The second contact member 424, the second elastic member 428 are arranged inside the second hollow cylinder 422.

The second elastic member 428 is a spring. A first end of the second elastic member 428 adjacent to the base board abuts against a second stopper 429. A second end of the second elastic member 428 is pressed against the second contact member 424 such that a part of the second contact member 424 protrudes out of the second opening 423.

The second contact member 424 comprises a third hollow cylinder 425. A third collar 426 is provided around the outer sidewall of the third hollow cylinder 425. The third collar 426 is pressed by the second end of the second elastic member 428 and a second end of the third hollow cylinder 425 away from the base board protrudes out of the second opening 423.

In this implementation, a second collar 427 is provided at the second end of the third hollow cylinder 425. The second collar 427 extends from the second end of the third hollow cylinder 425 outwards and configured to prevent the second end of the third hollow cylinder 425 from moving into the second hollow cylinder 422. The second collar 427 arches along the second direction Z away from the base board to form a rounded edge.

Figure 5:
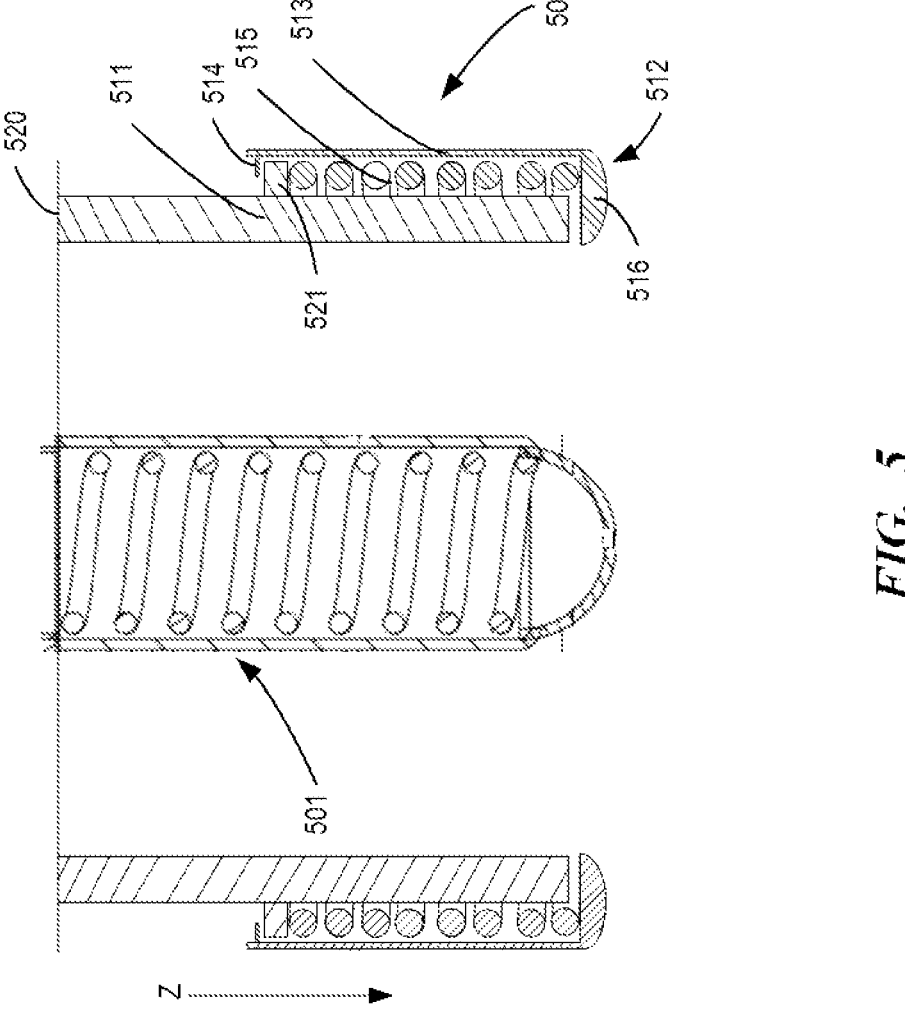
FIG. 5 illustrates a schematic view of a male module of an example RF connector in accordance with some further example implementations of the present disclosure.

FIG. 5 illustrates a schematic view of a male module of an example RF connector in accordance with some further example implementations of the present disclosure. The difference between the RF connector in FIG. 5 and the connector 304 illustrated in FIG. 3B is the structure of the second contact member. As illustrated in FIG. 5, the male module comprises an inner conductor 501, which may be corresponding to the inner conductor as illustrated in FIG. 3B. Further, the male module comprises an outer conductor 502. The outer conductor 502 comprises a second cylinder body 511. The second cylinder body 511 extends along the second direction Z, from the base board 520.

The second contact member 512 includes a fourth hollow cylinder 513 sleeved around the second cylinder body 511. A second stopper 521 is provided on an outer sidewall of the second cylinder body 511. A second projection 514 is provided on the inner sidewall of the fourth hollow cylinder 513. The second projection 514 is configured to abut against the second stopper 521 to prevent the second contact member 512 from moving away from the second cylinder body 511. The second contact member 512 further includes a third collar 516. An edge of the third collar 516 is connected to an edge of a first end of the fourth hollow cylinder 513 away from the second stopper 521. The second elastic member 515 is provided between the outer sidewall of the second cylinder body 511 and the inner sidewall of the fourth cylinder body 523-1, and the second end of the second elastic member 515 abuts against an inner surface of the third collar 516.

Figure 6:
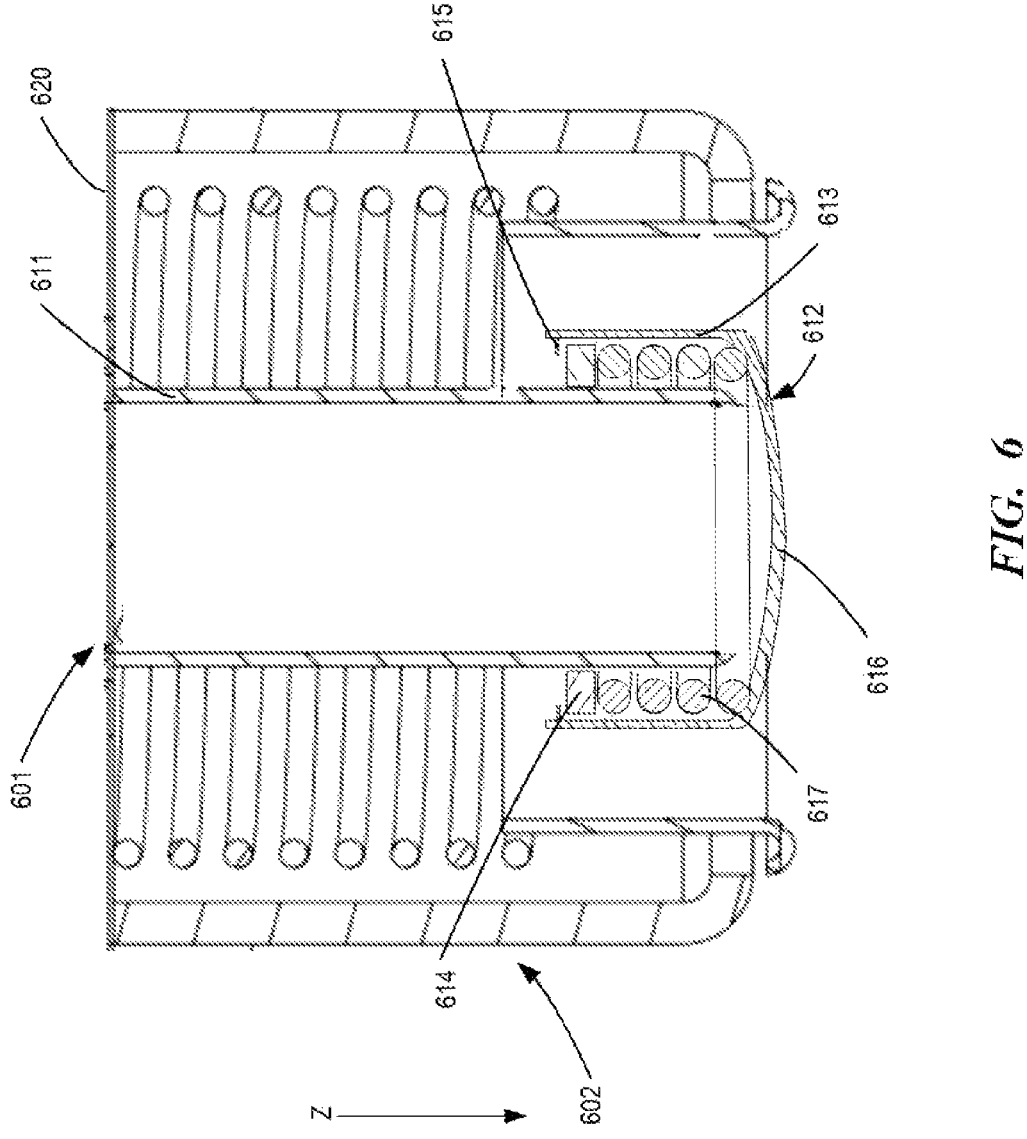
FIG. 6 illustrates a schematic view of a male module of an example RF connector in accordance with yet further example implementations of the present disclosure.

FIG. 6 illustrates a schematic view of an example RF connector in accordance with yet further example implementations of the present disclosure. The difference between the RF connector in FIG. 6 and the connector 304 illustrated in FIG. 3B is the structure of the first contact member. As illustrated in FIG. 6, the male module comprises an outer conductor 602, which may be corresponding to the outer conductor as illustrated in FIG. 3B. Further, the male module comprises an inner conductor 601. The inner conductor 601 comprises a first cylinder body 611. The first cylinder body 611 extends along the second direction Z from the base board 620.

The male module comprises a first contact member 612. The first contact member 612 includes a second hollow cylinder 613. The second hollow cylinder 613 is sleeved around the first cylinder body 611. A first stopper 614 is provided on an outer sidewall of the first cylinder body 611. A first projection 615 is provided on an inner sidewall of the second hollow cylinder 613. The first projection 615 is configured to abut against the first stopper 614 to prevent the first contact member 612 from moving away from the first cylinder body 611.

The first contact member 612 further includes a first spherical member 616. An edge of the first spherical member 616 is connected to an edge of a first end of the second hollow cylinder 613 adjacent to the second end of the first cylinder body 611. The first elastic member 617 is provided between the outer sidewall of the first cylinder body 611 and the inner sidewall of the second hollow cylinder 613, and the second end of the first elastic member 617 abuts against an inner surface of the first spherical member 616.

Figure 7:
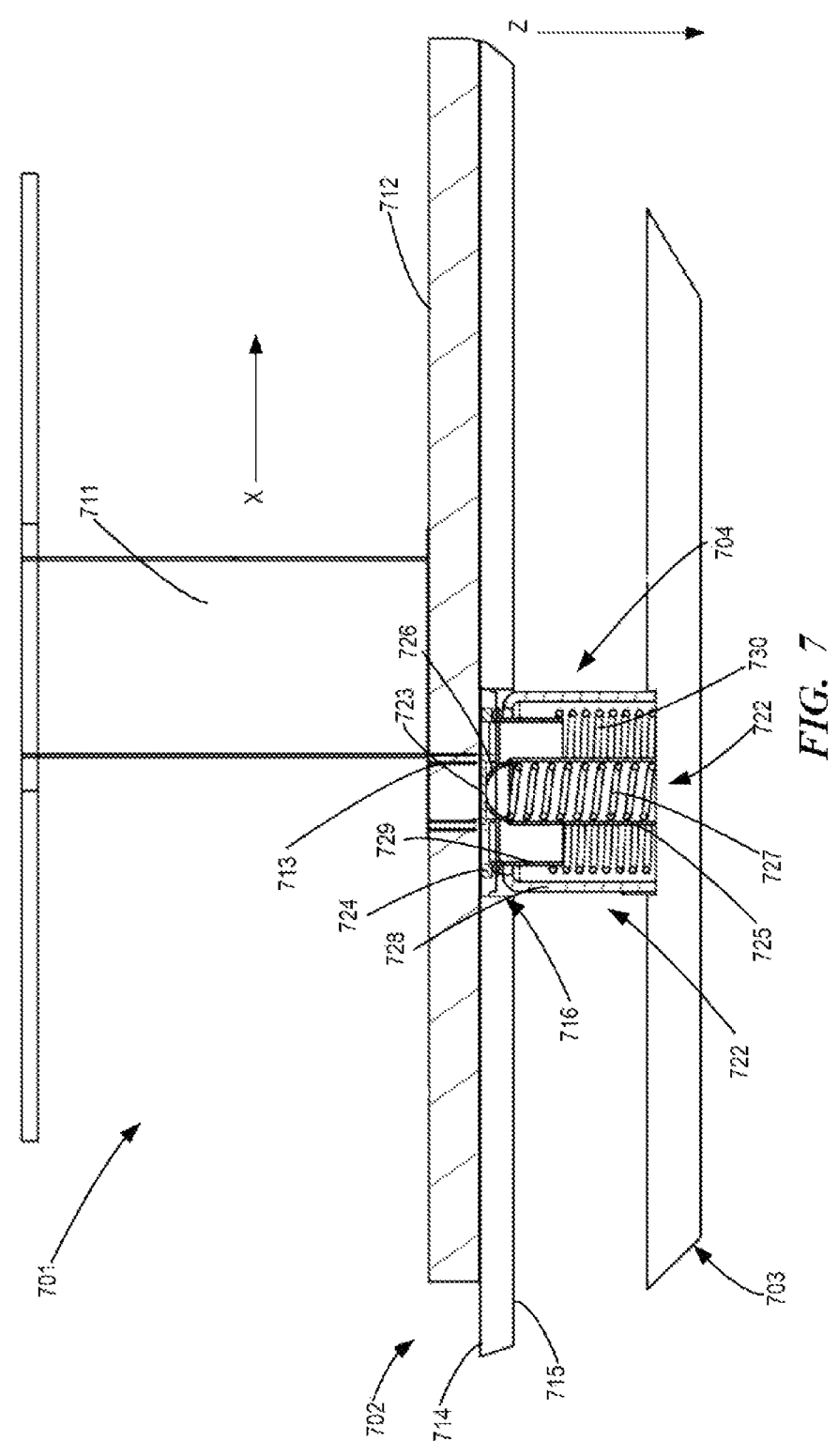
FIG. 7 illustrates a partial section view of a part of the example RF transmission structure in accordance with some further example implementations of the present disclosure.

FIG. 7 illustrates a partial section view of a part of the example RF transmission structure in accordance with some further example implementations of the present disclosure. The difference between the RF connector in FIG. 7 and the connector 304 illustrated in FIG. 3B is the relative position of the male module and the female module of the connector. In particular, the male module of the connector 704 is fixed on the main board, and the female module of the connector 704 is fixed on the base board 712 of the antenna module 701.

As illustrated in FIG. 7, the RF transmission structure comprises the antenna module 701 and the connector 704, as well as a part of the separation plate 702 and a part of the main board 703. The antenna module 701 comprises an inner antenna 711, the base board 712, and a trace 713. The base board 712 supports the antenna 711. The trace 713 is provided on the base board 712 and is connected to the antenna 711. The separation plate 702 includes a first surface 714 and a second surface 715 opposite to the first surface 714. The first surface 714 and the second surface 715 extend along the first direction X. The antenna module 701 is fixed on the first surface 714, and the second surface 715 faces towards the main board 703. The separation plate 702 further comprises a through hole 716 to allow the connector 704 to extend from the base board 712 to the main board 703. The main board 703 extends along the first direction X. The main board 703 is connected with the antenna module 701 via the connector 704.

As illustrated, the male module includes an inner conductor 721 and an outer conductor 722. Both the inner conductor 721 and the outer conductor 722 extend along the second direction Z and pass through the through hole 716 in the separation plate 702. The inner conductor 721 and the outer conductor 722 are arranged on the surface of the main board 703, facing towards the second surface 715 of the separation plate 702. The inner conductor 721 and the outer conductor 722 may be connected to the electronic components on the main board 703. The inner conductor 721 contacts the inner pad 723 and the outer conductor 722 contacts the outer pad 724.

The inner conductor 721 comprises a first cylinder body 725. The first cylinder body 725 extends along the second direction Z. A first end of the first cylinder body 725 is fixed on main board 703. The first cylinder body 725 includes a first hollow cylinder. The inner conductor 721 comprises a first contact member 726 and a first elastic member 727. The first contact member 726 and the first elastic member 727 are arranged inside the first hollow cylinder. A first end of the first elastic member 727 abuts against the main board 703 and a second end of the first elastic member 727 away from the main board 703 is pressed against the first contact member 726. The first contact member 726 is arranged at a second end of the first cylinder body 725 away from the main board 703. The first contact member 726 comprises a first spherical member. The first spherical member is pressed by the first elastic member 727 such that a part of first spherical member protrudes out of the first opening such that the outer surface of the first spherical member contacts the inner pad 723.

The outer conductor 722 comprises a second cylinder body 728. The second cylinder body 728 extends along the second direction from the base board 712. The second cylinder body 728 may be coaxial with the first cylinder body 725. A second opening is provided at a first end of the second cylinder body 728 away from the main board 703. The second contact member 729, the second elastic member 730 are arranged inside the second cylinder body 728.

A first end of the second elastic member 730 abuts against the base board 712. A second end of the second elastic member 730 is pressed against the second contact member 729 such that at least part of the second contact member 729 protrudes out of the second opening and contacts the outer pad 724.

The inner pad 723 is a circle conductor, and the outer pad 724 is a ring conductor coaxial with inner pad 723. The inner pad 723 and the outer pad 724 are arranged on a surface of the base board 712 fixed to the first surface 714 of the separation plate 702, and the inner pad 723 is electrically coupled to the trace 713.

With the connection scheme in the illustrated implementation, when the antenna 711 receives RF signals, the RF signals may be transmitted from the antenna 711 via the trace 713, the inner pad 723, and the inner conductor 721 to the electronic components on the main board 703.

In the assembly stage, the antenna module 701 may be fixed on the separation plate 702 in the first place. Then, the inner pad 723 and the outer pad 724 may be fixed to the second surface of the base board 712, for example, by welding, such that the inner pad 723 is electrically coupled to the trace 713. The outer pad 724 may also be fixed to the second surface of the base board 712 but without connecting to other conducting members to provide grounding. Later, the main board 703 may be mounted in place. When the main board 703 is properly mounted, the inner conductor 721 and the outer conductor 722 will be fixed on the main board 703. Then, the separation plate 702 with the antenna module 701 fixed thereon may be placed onto the main board 703 such that the corresponding fixing members on the main board 703 and the separation plate 702 are correctly aligned with each other. In the meantime, the inner conductor 721 is aligned with the inner pad 723, and the outer conductor 722 is aligned with the outer pad 724.

Figure 8:
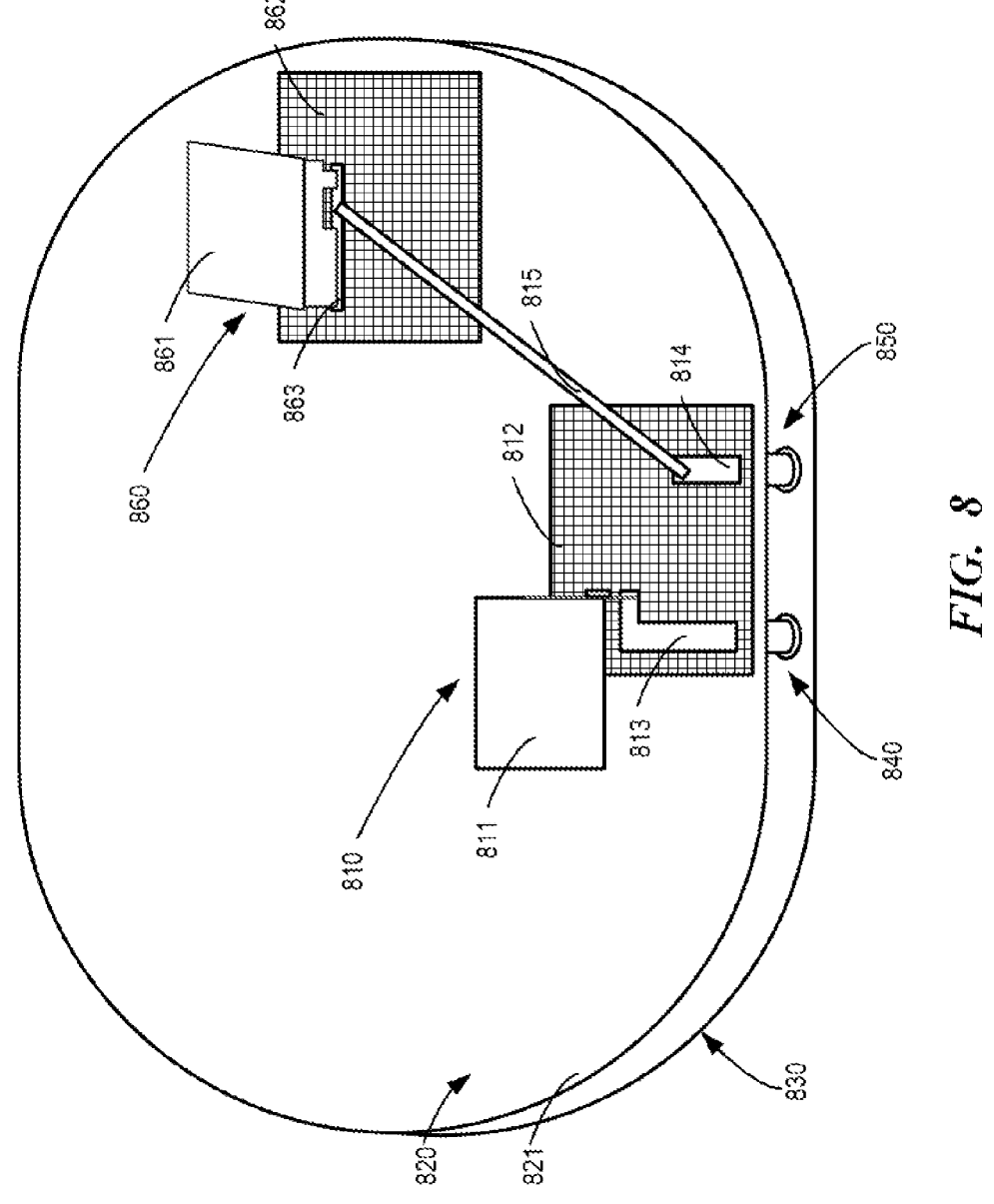
FIG. 8 illustrates a schematic section view of an example RF transmission structure of an RF transmission device in accordance with some further example implementations of the present disclosure.

FIG. 8 illustrates a schematic section view of an example RF transmission structure of an RF transmission device in accordance with some further example implementations of the present disclosure. As illustrated in FIG. 8, the RF transmission structure comprises two antenna modules 810 and 860, distributed on the first surface 821 of the separation plate 820. Two RF connectors 840 and 850 extend between the antenna module 810, the antenna module 860 and the main board 830 to connect the antenna module 810 and the antenna module 860 with the main board 830.

The antenna module 810 comprises an antenna 811, a base board 812, and a trace 813. Relatively, the antenna module 860 comprises an antenna 861, a base board 862, and a trace 863. The connectors 840 and 850 are both fixed to the base board 812, and no connector is fixed to the base board 862. In this case, the antenna module 810 further comprises a trace 814 connected to the additional connector 850. The trace 814 is connected to the trace 863 via a transmission line 815 such that the RF signals received from the antenna 861 can be transmitted from the antenna module 860 via the transmission line 815 and the connector 850 to the main board 830.

With this implementation, by arranging the plurality of connectors in a relatively centralized manner, the space usage on the main board can be maximized, and the assemble flexibility can be increased.

Figure 9:
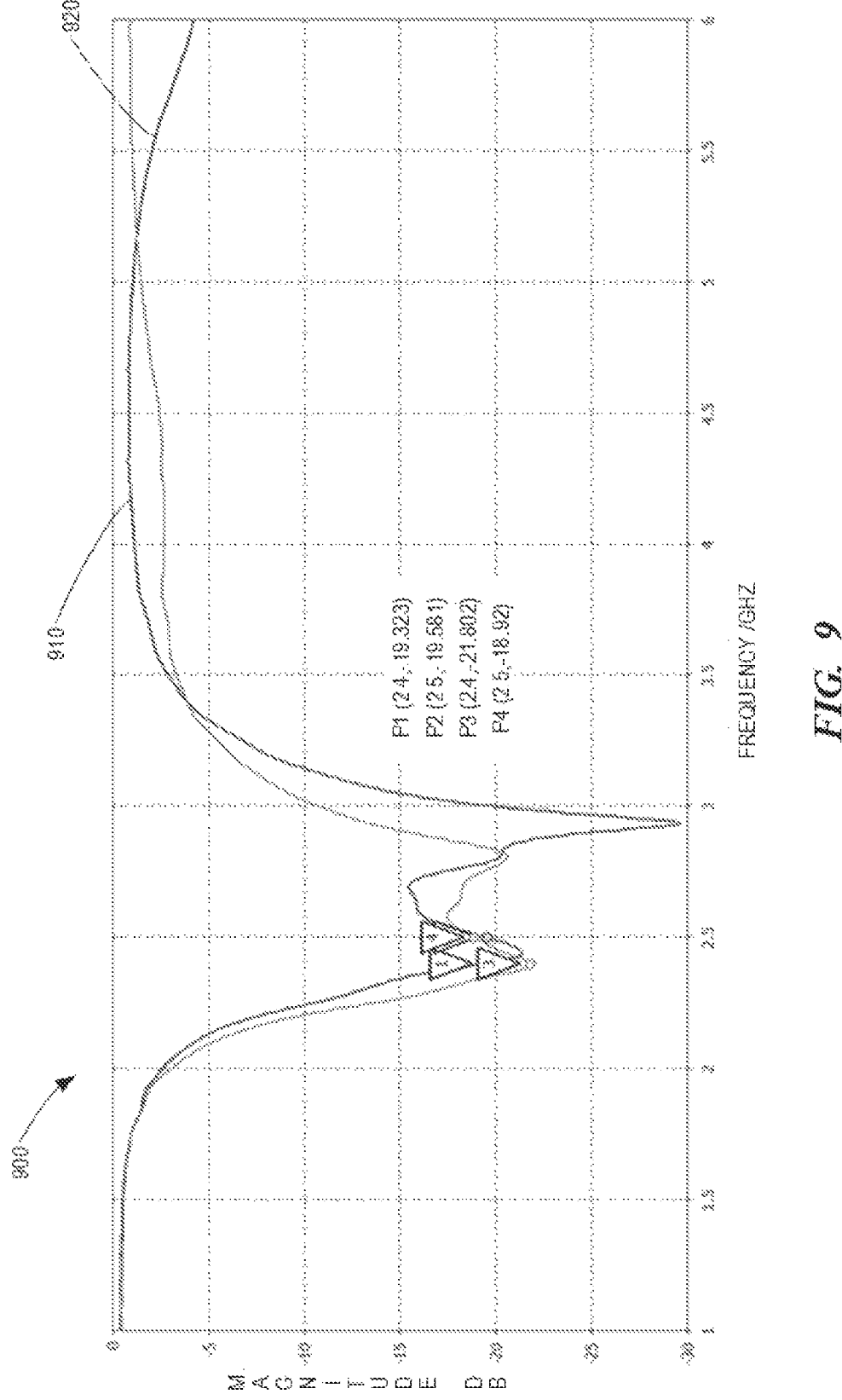
FIG. 9 illustrates a schematic diagram of RF performance of an example RF transmission structure in accordance with some further example implementations of the present disclosure.

FIG. 9 illustrates a schematic diagram 900 of the RF performance of an example RF transmission structure in accordance with some further example implementations of the present disclosure. As illustrated in FIG. 9, the horizontal axis of the diagram 900 is the frequency and the vertical axis of the diagram 900 is magnitude. The diagram 900 comprises a course 910, representing a frequency performance of an RF connections structure with a conventional I-PEX RF connector and a course 920, representing a frequency performance of an RF connections structure with an RF connector in accordance with example implementations of the present disclosure. The frequency performance of the I-PEX RF connector and the frequency performance of the connector disclosed herein are substantially the same.

Figure 10A:
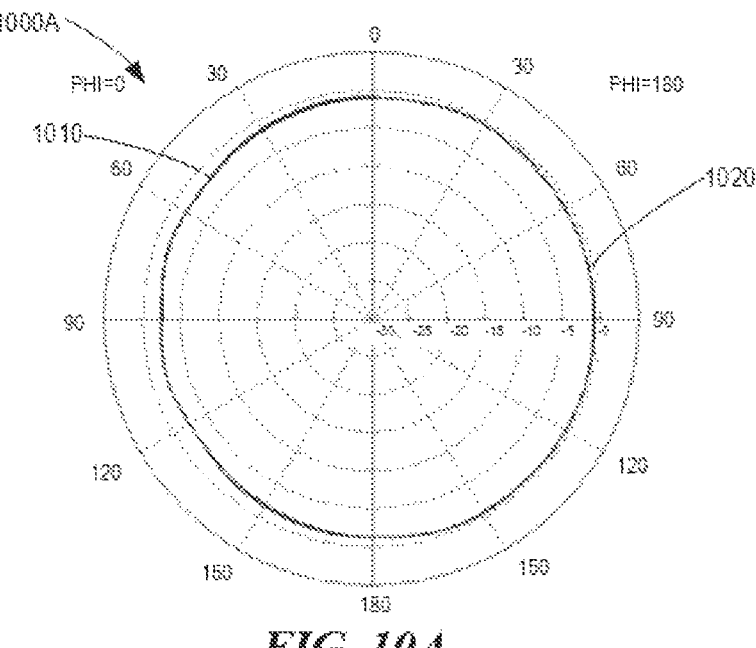
FIGS. 10A-10B illustrate schematic diagrams of antenna pattern comparison of an IPEX connector and the RF transmission structure in accordance with some further example implementations of the present disclosure.
Figure 10B:

FIGS. 10A-10B illustrate schematic diagrams of antenna pattern comparison of an I-PEX connector and the RF transmission structure in accordance with some further example implementations of the present disclosure. As illustrated in FIG. 10A, the diagram 1000A illustrates a far field pattern 1010 of an RF connections structure with a conventional I-PEX RF connector and a far field pattern 1020 of an RF connections structure with an RF connector in accordance with example implementations of the present disclosure at 2.4 GHz. The far field pattern 1010 and the far field pattern 1020 are almost identical.

As illustrated in FIG. 10B, the diagram 1000B illustrates a far field pattern 1030 of an RF connections structure with a conventional I-PEX RF connector and a far field pattern 1040 of an RF connections structure with an RF connector in accordance with example implementations of the present disclosure at 5.9 GHz. The difference between the far field pattern 1030 and the far field pattern 1040 is very small.

Figure 10B:
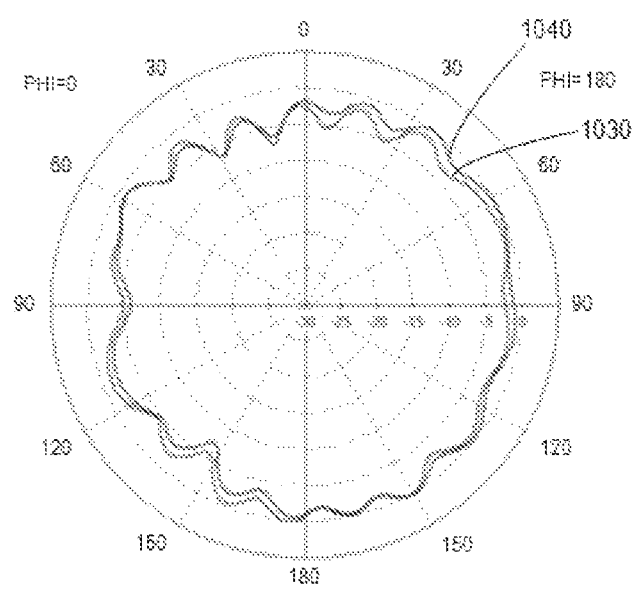

As it can be seen from FIGS. 9-10B, the frequency performance of the I-PEX RF connector and the frequency performance of the connector disclosed herein are substantially the same. Therefore, the connector disclosed herein can provide an RF connection with a frequency performance meeting relative standards while also providing a structure with less stress.

While the above discussion used a Wi-Fi communication standard as an illustrative example, in other implementations, a wide variety of communication standards and, more generally, wireless communication technologies may be used. Furthermore, while some of the operations in the foregoing implementations were implemented in hardware or software, in general, the operations in the preceding implementations can be implemented in a wide variety of configurations and architectures. Therefore, some or all of the operations in the foregoing implementations may be performed in hardware, software, or both.

It should be noted that specific terms disclosed in the present disclosure are proposed for convenience of description, and a better understanding of example implementations of the present disclosure, and the use of these specific terms may be changed to another format within the technical scope or spirit of the present disclosure.

Further, while operations are depicted in a particular order, this should not be understood as requiring that such operations be performed in the particular order illustrated or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is illustrated by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. An access point (AP), comprising:
an antenna module comprising an antenna, a base board for supporting the antenna, and a trace connected to the antenna;
a separation plate comprising a first surface extending along a first direction, wherein the antenna module is fixed on the first surface of the separation plate;
a main board for supporting electronic components of the AP and arranged away from a second surface of the separation plate opposite to the first surface; and a connector comprising an inner conductor and an outer conductor extending along a second direction perpendicular to the first direction and passing through a hole in the separation plate for connecting the trace with the electronic components in the main board, wherein the inner conductor and the outer conductor are retractable along the second direction.

2. The AP of claim 1, wherein the inner conductor comprises:

a first cylinder body extending along the second direction from the base board, wherein a first end of the first cylinder body adjacent to the base board is coupled to the trace;

a first contact member arranged at a second end of the first cylinder body away from the base board and configured to move along the second direction towards the base board upon contacting the main board; and a first elastic member, wherein a first end of the first elastic member abuts against a first stopper configured to prevent the first end of the first elastic member from moving along the second direction towards the base board and a second end of the elastic member away from the base board is pressed against the first contact member.

3. The AP of claim 2, wherein the first cylinder body includes a first hollow cylinder, and a first opening is provided at a first end of the first hollow cylinder away from the separation plate.

4. The AP of claim 3, wherein the first contact member, the first elastic member and the first stopper are arranged inside the first hollow cylinder, and the first contact member is configured to be pressed by the second end of the first elastic member such that at least part of the first contact member protrudes out of the first opening.

5. The AP of claim 3, wherein the first contact member comprises a first spherical member, and an edge of the first spherical member contacts an inner sidewall of the first hollow cylinder, and at least a part of the first spherical member protrudes out of the first opening.

6. The AP of claim 5, wherein a first collar is provided at the first opening, and the first collar extends inwards from the first opening, and wherein the first collar is configured to prevent the first spherical member from completely moving out of the hollow cylinder.

7. The AP of claim 2, wherein the first contact member includes a second hollow cylinder sleeved around the first cylinder body, the first stopper is provided on an outer sidewall of the first cylinder body, and wherein a first projection is provided on the first contact member and configured to abut against the first stopper to prevent the first contact member from moving away from the first cylinder body.

8. The AP of claim 7, wherein the first contact member further includes a first spherical member, and an edge of the first spherical member is connected to an edge of a first end of the second hollow cylinder adjacent to the second end of the first cylinder body; and wherein the first elastic member is provided between the outer sidewall of the first cylinder body and the inner sidewall of the second hollow cylinder, and the second end of the first elastic member abuts against an inner surface of the first spherical member.

9. The AP of claim 1, wherein the outer conductor comprises:

a second cylinder body extending along the second direction from the base board;

a second contact member, arranged at a second end of the second cylinder body away from the base board and configured to move along the second direction towards the base board upon contacting the main board; and a second elastic member, a first end of the second elastic member abuts against a second stopper configured to prevent the first end of the second elastic member moving along the second direction towards the base board and a second end of the second elastic member away from the base board is pressed against the second contact member.

10. The AP of claim 9, wherein the second cylinder body includes a second hollow cylinder, and a second opening is provided at a first end of the second hollow cylinder away from the separation plate, and wherein the second contact member, the second elastic member and the second stopper are arranged inside the second hollow cylinder, and the second contact member is configured to be pressed by the second end of the second elastic member such that at least part of the second contact member protrudes out of the second opening.

11. The AP of claim 10, wherein the second contact member comprises a third hollow cylinder, and a first end of the third hollow cylinder adjacent to the base board is pressed by the second end of the second elastic member and a second end of the third hollow cylinder away from the base board protrudes out of the second opening.

12. The AP of claim 11, wherein a second collar is provided at the second end of the third hollow cylinder, and the second collar extends from the second end of the third hollow cylinder outwards and the second collar is configured to prevent the second end of the third hollow cylinder from moving into of the third hollow cylinder.

13. The AP of claim 12, wherein the second collar arches along the second direction away from the base board.

14. The AP of claim 9, wherein the second contact member includes a fourth hollow cylinder sleeved around the second cylinder body, and the second stopper is provided on an outer sidewall of the second cylinder body, and wherein a second projection is provided on the second contact member and configured to abut against the second stopper to prevent the second contact member from moving away from the second cylinder body.

15. The AP of claim 14, wherein the second contact member includes a third collar, and an edge of the third collar is connected to an edge of a first end of the fourth hollow cylinder adjacent to the second end of the second cylinder body; and wherein the second elastic member is provided between the outer sidewall of the second cylinder body and the inner sidewall of the fourth cylinder body, and the second end of the second elastic member abuts against an inner surface of the third collar.

16. The AP of claim 1, wherein the connector further comprises an inner pad and an outer pad arranged on the main board for contacting the inner conductor and the outer conductor respectively.

17. A radio frequency (RF) connector, comprising:

a first module adapted to be fixed to a first RF transmission member and including an inner conductor and an outer conductor, wherein the inner conductor and the outer conductor extend along a second direction from the first RF transmission member and are retractable along the second direction; and a second module adapted to be fixed to a second RF transmission member and including an inner pad and an outer pad, wherein the inner pad is configured to be connected to the inner conductor, and the outer pad is configured to be connected to the outer conductor to allow RF signals to be transmitted between the first RF transmission member and the second RF transmission member.

18. The RF connector of claim 17, wherein the inner conductor comprises:

a first cylinder body extending along the second direction from the base board, wherein a first end of the first cylinder body adjacent to the base board is coupled to the trace;

a first contact member arranged at a second end of the first cylinder body away from the base board and configured to move along the second direction towards the base board upon contacting the main board; and a first elastic member, wherein a first end of the first elastic member abuts against a first stopper configured to prevent the first end of the first elastic member from moving along the second direction towards the base board and a second end of the elastic member away from the base board is pressed against the first contact member.

19. The RF connector of claim 18, wherein the outer conductor comprises:

a second cylinder body extending along the second direction from the base board;

a second contact member, arranged at a second end of the second cylinder body away from the base board and configured to move along the second direction towards the base board upon contacting the main board; and a second elastic member, wherein a first end of the second elastic member abuts against a second stopper configured to prevent the first end of the second elastic member moving along the second direction towards the base board and a second end of the second elastic member away from the base board is pressed against the second contact member.

20. A radio frequency (RF) transmission device, comprising:

an antenna module for receiving RF signals;

a signal processing module for processing RF signals;

a first module adapted to be fixed to the antenna module and including an inner conductor and an outer conductor, wherein the inner conductor and the outer conductor extend along a second direction from the antenna module and are retractable along the second direction; and a second module adapted to be fixed to the signal processing module and including an inner pad and an outer pad, wherein the inner pad is connected to the inner conductor and the outer pad is connected to the outer conductor to allow RF signals to be transmitted between the first RF transmission member and the second RF transmission member.

* * * * *